United States Patent
Sloth

(10) Patent No.: US 8,143,739 B2
(45) Date of Patent: Mar. 27, 2012

(54) WIND TURBINE COMPRISING A DETUNER

(75) Inventor: Erik Billeskov Sloth, Aalborg Ø (DK)

(73) Assignee: Vestas Wind Systems A/s, Aarhus N (DK)

( * ) Notice: Subject to any disclaimer, the term of this patent is extended or adjusted under 35 U.S.C. 154(b) by 491 days.

(21) Appl. No.: 12/227,612

(22) PCT Filed: Jun. 8, 2007

(86) PCT No.: PCT/DK2007/000280
§ 371 (c)(1),
(2), (4) Date: Apr. 7, 2009

(87) PCT Pub. No.: WO2007/140787
PCT Pub. Date: Dec. 13, 2007

(65) Prior Publication Data
US 2010/0013234 A1    Jan. 21, 2010

(30) Foreign Application Priority Data
Jun. 9, 2006 (DK) .................................. 2006 00785

(51) Int. Cl.
*H02P 9/04* (2006.01)
(52) U.S. Cl. .......................................... 290/55; 290/44
(58) Field of Classification Search ............ 290/44, 290/54, 55; 415/1, 2.1, 3.1, 4.2, 4.3, 4.5, 415/7; 416/1, 132 B, 7
See application file for complete search history.

(56) References Cited

U.S. PATENT DOCUMENTS

| | | | |
|---|---|---|---|
| 3,667,214 A | 6/1972 | Addie | |
| 4,198,572 A * | 4/1980 | Kant | 290/44 |
| 4,308,728 A * | 1/1982 | Croset | 464/83 |
| 4,774,855 A | 10/1988 | Murrell et al. | |
| 6,290,620 B1 | 9/2001 | Tsai et al. | |
| 7,309,930 B2 * | 12/2007 | Suryanarayanan et al. | 290/55 |

FOREIGN PATENT DOCUMENTS

| | | |
|---|---|---|
| EP | 1 197 678 A2 | 10/2001 |
| EP | 1 293 657 A1 | 3/2003 |
| WO | WO 03/031811 A2 | 4/2003 |
| WO | WO 2007/119953 A1 | 10/2007 |

OTHER PUBLICATIONS

ESM GmbH, Vibration Absorber (Mass Damper), brochure, Apr. 7, 2009.

* cited by examiner

*Primary Examiner* — Dang Le
(74) *Attorney, Agent, or Firm* — Wood, Herron & Evans, L.L.P.

(57) ABSTRACT

A wind turbine includes a wind-driven rotor and a drive chain for transmitting the driving force to a power converter, the drive chain including at least one rotatable driving element, including e.g. a gear with associated input and output shafts. The rotor and the driving element of the drive chain define a torsional resonance frequency, which is controlled or influenced by a detuner of the wind turbine. The detuner comprises a mass element and an elastic element. The resonance frequency is controlled or influenced by the detuner, so that it does not coincide with frequencies occurring in the drive chain during operation of the wind turbine, so as to thereby reduce undesired loads in the drive chain and/or tonality, i.e. noise.

18 Claims, 3 Drawing Sheets

WIND TURBINE COMPRISING A DETUNER

TECHNICAL FIELD

The present invention relates to a wind turbine, and more particularly to improvements to the drive chain of the wind turbine. Embodiments of the invention address problems related to torsional vibrations.

SUMMARY OF THE INVENTION

Whereas significant improvements have been made in the development of drive chains for wind turbines, problems remain with regard to lifetime of mechanical drive elements, such as gears, and with regard to torsional vibrations in the drive chain.

The present inventor has found that forces in the drive chain deriving from e.g. aerodynamic forces acting on the rotor blades of the wind turbine, and/or from interacting gearwheels in a gear of the drive chain, such as so-called gear meshing frequency, may excite torsional resonances in the drive chain. As a consequence of excited torsional resonances, undesired loads are imparted on the drive elements of the drive chain. It has moreover been found that tonality, i.e. noise emitted from the wind turbine, occurs as a consequence of torsional vibrations in the drive chain. Hence, it is an object of preferred embodiments of the invention to provide an improvement to the drive chain of a wind turbine, which reduces the risk of excitement of torsional resonances in the drive chain. It is a further object of preferred embodiments of the invention to provide an improvement to the drive chain, which reduces tonality.

The invention accordingly provides a wind turbine comprising:
- a wind-driven rotor for converting wind energy to a mechanical driving force;
- a power converter for converting the driving force to exploitable power;
- a drive chain for rotatably transmitting the driving force to the power converter, the drive chain comprising at least one rotatable driving element;

whereby at least the rotor and the at least one rotatable driving element of the drive chain define at least one torsional resonance frequency;
wherein the drive chain further comprises a detuner having:
- at least one mass element having a given mass inertia;
- at least one elastic element having elastic properties;

the mass element and the elastic element being arranged to rotate during operation of the wind turbine, whereby said torsional resonance frequency is influenced by said mass inertia and said elastic properties.

The invention additionally provides a use of a detuner in a drive chain of a wind turbine for controlling a torsional resonance frequency in the drive chain, the wind turbine comprising a wind-driven rotor for converting wind energy to a mechanical driving force, and a power converter for converting the driving force to exploitable power, the drive chain being arranged to rotatably transmit the driving force to the power converter and comprising at least one rotatable driving element, whereby at least the rotor and the at least one rotatable driving element of the drive chain define said torsional resonance frequency, the detuner having at least one mass element having a given mass inertia, and at least one elastic element having elastic properties, the mass element and the elastic element being arranged to rotate during operation of the wind turbine, whereby said torsional resonance frequency is influenced by said mass inertia and said elastic properties.

In the wind turbine and use of the invention it may be achieved that the torsional resonance frequency depends from the mass inertia and the elastic properties. Hence, the resonance frequency may be controlled, so that it does not coincide with frequencies occurring in the drive chain during operation of the wind turbine. In case the detuner allows the elastic properties of the elastic element of the detuner to be varied, e.g. by setting a distortion of the elastic element, the torsional resonance frequency in the drive chain may be controlled or set once the wind turbine has been installed at its site of operation, or even varied during operation. Alternatively, if the exciting frequencies are known at the stage of designing the drive chain, the parameters of the detuner, including the mass inertia of the mass element and/or the elasticity of the elastic element, may be chosen already at the design stage by appropriate modeling of the drive chain.

The detuner may e.g. comprise an adjustable damper as disclosed in European patent publication No. EP 1 197 678 A2, which is hereby incorporated by reference.

The elastic element may e.g. be made from rubber, latex or any other material having elastic properties, including various plastics materials, such as various types of Nylon. Typically, Nylon is used in the elastic element for detuning relatively high frequencies, whereas rubber or latex is used for detuning relatively low frequencies.

The power converter may include a generator for converting the mechanical driving force to electricity. It should, however, be understood that the power converter may also include a mechanical system, e.g. a gear system, for further transmission of mechanical driving force.

The at least one driving element may include any shaft, gear or other rotatable element in the drive chain, through which a mechanical driving force is transmitted.

In the present context, the term frequency may designate a frequency measured in vibrations per second (Hz) and/or an angular velocity measured in radians per second. The torsional vibrations giving rise to tonality in wind turbines usually have a frequency of about 50-1000 Hz.

The detuner may be mounted radially around a drive shaft of the drive chain. For example, the elastic element may include or be in the form of a substantially annular elastomeric element. This element may supported by a supporting structure, such as one more annular members, whose inner circumference or circumferences encircle an outer circumference of the elastic element. Several elastic elements may be provided. In one embodiment, the outer circumference of the elastic element is essentially v-shaped when seen in longitudinal cross section. Thus, the elastic element may have a smaller outer diameter towards its ends than towards its middle to define opposing conical portions. In such an embodiment, the supporting structure may comprise two opposing support elements for engaging the respective conical portions of the elastic element, the support elements being essentially annular, with their inner circumferences defining inverted cones. The support elements may be permanently held together in fixed mutual relationship. Alternatively, their mutual relationship, i.e. position with respect to each other, may be variable. For example, they may be mutually fixed and held together by a releasable fastener, such as a screw or bolt. The variable mutual position of the support elements allow the distortion of the elastic element to be varied, as the force exerted by the support elements on the elastic element varies with the mutual position of the support elements. The elastic properties of the elastic element may thereby be varied. Other configurations are possible, which allow a variable distortion or force on the elastic element, e.g. configurations, in which only one end of the elastic element has a conical or tapered circumference, or configurations, in which the elastic element is encircled by a clamp or clip.

The mass element may include or be comprised in any structural element of the detuner, or it may form part of a structure for mounting the detuner to the drive chain. In the above embodiment including one or more support elements for the elastic element, the support element or elements may constitute also the mass element. Alternatively, the mass element may be provided as a separate member disposed coaxially with the elastic element or elements and/or longitudinally displaced therefrom.

For typical applications, i.e. applications wherein the detuner is mounted between a gear of the drive chain and the power converter, the detuner has a vibrating inertia of 0.5-5 $kgm^2$, such as 1-4 $kgm^2$, such as 1.5-3 $kgm^2$, such as 2-2.5 $kgm^2$. The total mass of the detuner is usually between 25 and 250 kg, such as 50-150 kg, such as 75-125 kg, such as 90-110 kg, including the mass of the mass element. In case the detuner includes a separate mounting member for mounting the detuner to the drive chain, e.g. a flange, the mass of such a mounting member is normally between 5 and 50 kg, such as 10-40 kg, such as 15-35 kg, such as 20-30 kg. The mass element or elements typically have a mass of 5-50 kg, such as 10-40 kg, such as 15-35 kg, such as 20-30 kg. Generally, the relationship between the required mass of the mass element or elements and the nominal rotational speed of the driving element is that increasing rotational speed requires lower masses and vice versa. In case the detuner is mounted between a gear of the drive chain and the power converter, i.e. downstream of the gear, it typically fits radially around a shaft having a diameter of 150-800 mm, such as 200-500 mm, such as 250-400 mm.

In case the drive chain comprises a gear arranged between the wind-driven rotor and the power converter, wherein an output shaft of the gear rotates at a higher speed than an input shaft thereof, the detuner is preferably arranged between the gear and the power converter. However, the detuner may also be provided at the input shaft of the gear or at an intermediate stage in the gear, in which case larger inertia and masses are required due to the gearing. In a typical wind turbine application, the input shaft of the gear rotates at the rotational speed of the wind turbine rotor, i.e. at approximately 10-25 rpm. The output shaft of the gear typically rotates at around 80-120 times this speed, i.e. at around 800-3000 rpm, such as at around 1000-2500 rpm. In preferred embodiments of the invention, the detuner is arranged between the gear and the power converter to benefit from the gearing, i.e. to achieve the desired detuning effect with a comparatively low mass. However, in other embodiments, the detuner is arranged between the wind turbine rotor and the gear. Between the rotor and the gear, there is often more space available for the detuner than between the gear and the power converter, whereas there is little free space available between the gear box and the power converter, making access for mounting and maintenance of the detuner somewhat more complicated.

The detuner may be integrated in or form part of another component, such as a component of the drive chain, such as a gearbox, a brake or a power converter. Such integration of the detuner with another component alleviates mounting difficulties, in particular at the high-speed side of the gear, i.e. between the gear and the power converter, where only limited space is available. It should be understood that "integrated in" and "forming part of" in the present context is intended to mean that the detuner is connected to or housed in the other component in question, e.g. connected to or housed in a housing of the other component. Embodiments, in which the detuner is integrated with another component are particularly suitable for applications, where the detuner is not provided as a retrofit component, but where the detuner is planned at the design stage of the wind turbine.

Embodiments are envisaged, in which a plurality of detuners are provided, e.g. one between the rotor and the gear, and one between the gear and the power converter.

The detuner may be supported by a fixed support of the drive chain, whereby an interconnection between the detuner and the fixed support is preferably less elastic than the elastic element. In the present context, a fixed support should be understood as a support, which is fixed relatively to a rotating driving element of the drive chain. The elasticities of the aforementioned interconnection and of the elastic element of the detuner may conveniently be defined in terms of spring constants, usually torsional spring constants. Thus, the interconnection between the detuner and the fixed support may define a first torsional spring constant, $k_1$, and the elastic element may define a second torsional spring constant, $k_2$. In preferred embodiments of the present invention, the first torsional spring constant $k_1$ is preferably at least two orders of magnitude greater than the second torsional spring constant $k_2$.

The detuner defines an angular resonance velocity, $\omega$, which is approximately equal to $\sqrt{k/j}$, where k denotes a detuner torsional spring constant, and j denotes an effective mass inertia of the detuner. When the detuner is mounted in the drive chain, the angular resonance velocity of the drive chain itself has been found to be approximately equal to the angular resonance velocity of the detuner $\omega$. The detuner torsional spring constant is approximately equal to $(k_1 * k_2)/(k_1+k_2)$. Hence, the detuner torsional spring constant k becomes approximately equal to $k_2$ when $k_1$ is significantly larger than $k_2$. For purposes of modeling resonance frequencies, it may be desirable that $k_1$ can be neglected at the design stage. Thus, $k_1$ is preferably significantly larger than $k_2$, most preferably at least two orders of magnitude greater than $k_2$. The interconnection between the detuner and the fixed support is preferably a stiff connection.

A brake usually included in drive chains of wind turbines may conveniently serve as the fixed support for the detuner. The brake is normally provided downstream of the gear in the drive chain, which is also the preferred location for the detuner. Additionally, due to its radial extent and mechanical strength the brake may usually provide the dimensions and stability required to support the detuner, there being optionally provided a separate flange between the mass element(s) of the detuner and the brake for increasing mechanical stability.

Alternatively, a coupling mechanism of the drive chain may serve as the fixed support for the detuner. The coupling mechanism may e.g. comprising a coupling disc, to which the detuner is connected via a flange. The coupling mechanism usually includes a flexible pipe or shaft as a coupling element.

DESCRIPTION OF THE DRAWINGS

Embodiments of the invention will now be further described with reference to the drawings, in which.

Figure 1:
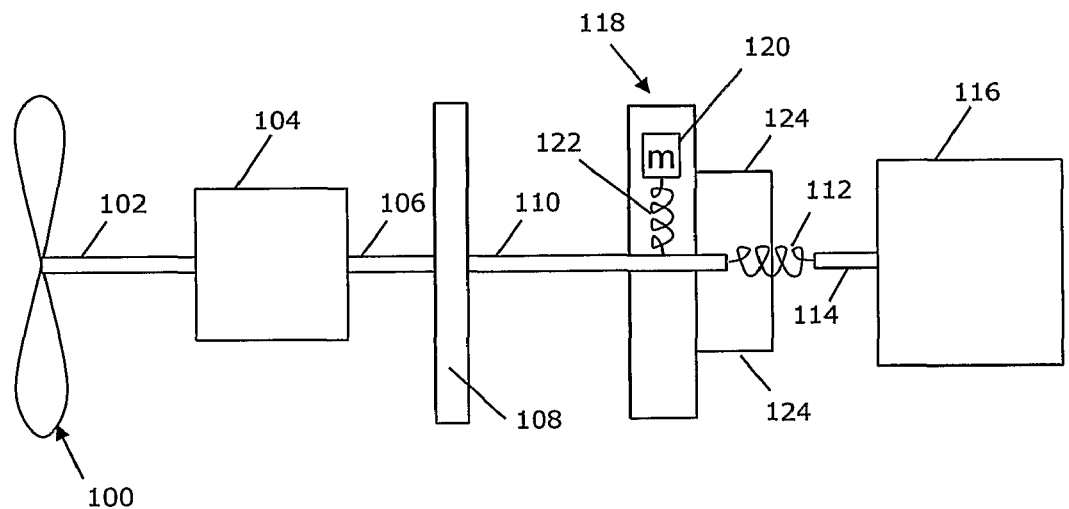
FIGS. 1 and 2 are schematic illustrations of drive chains of first and second embodiments of a wind turbine according to the invention.
Figure 2:
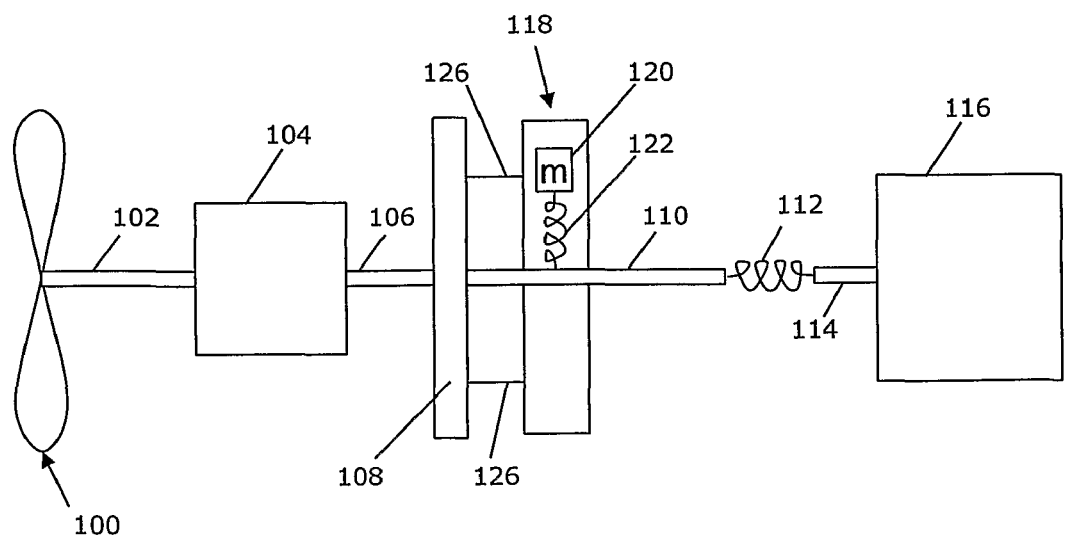

The wind turbines schematically illustrated in FIGS. 1 and 2 comprise a wind-driven rotor 100 comprising, e.g., three rotor blades. The rotor 100 drives an input shaft 102 for a gear 104, an output shaft 106 of which extends to a brake 108. A downstream shaft 110 extends to a coupling element 112, which is connected to a power converter 116 via a further shaft 114. It will be appreciated that the shafts 102, 106, 110 and 114 as well as the gear 104, brake 108 and coupling 112 form part of a drive chain of the wind turbine for transmitting a mechanical driving force from the rotor 100 to the power converter 116. The power converter 116 may e.g. comprise a generator for converting the mechanical driving force to exploitable power, such as electricity.

Figure 3:
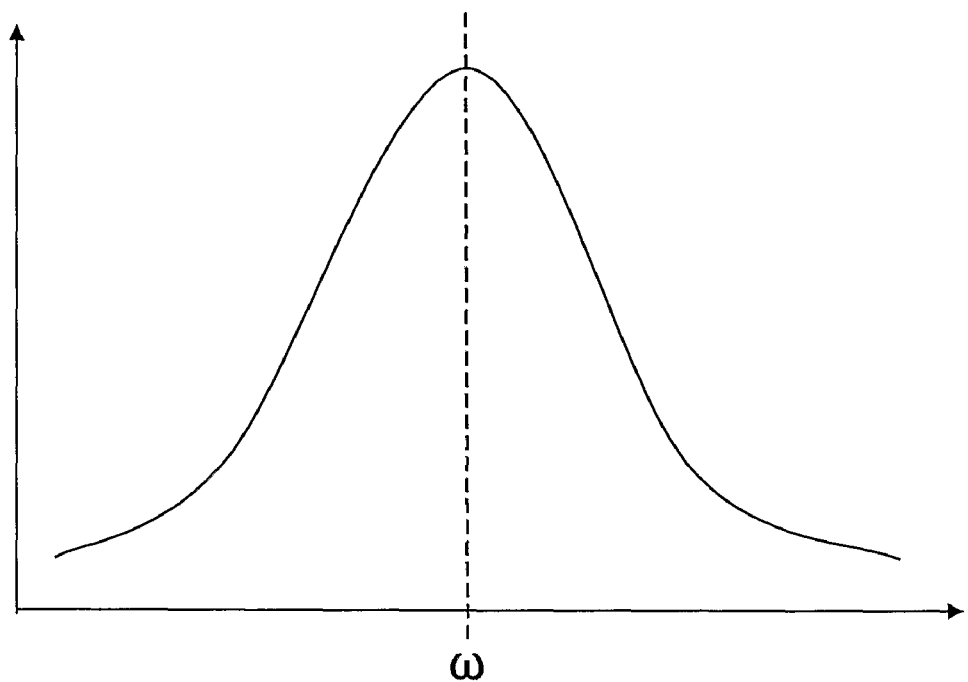
FIGS. 3 illustrates the torsional resonance frequency in a prior art drive chain including no detuner.
Figure 4:
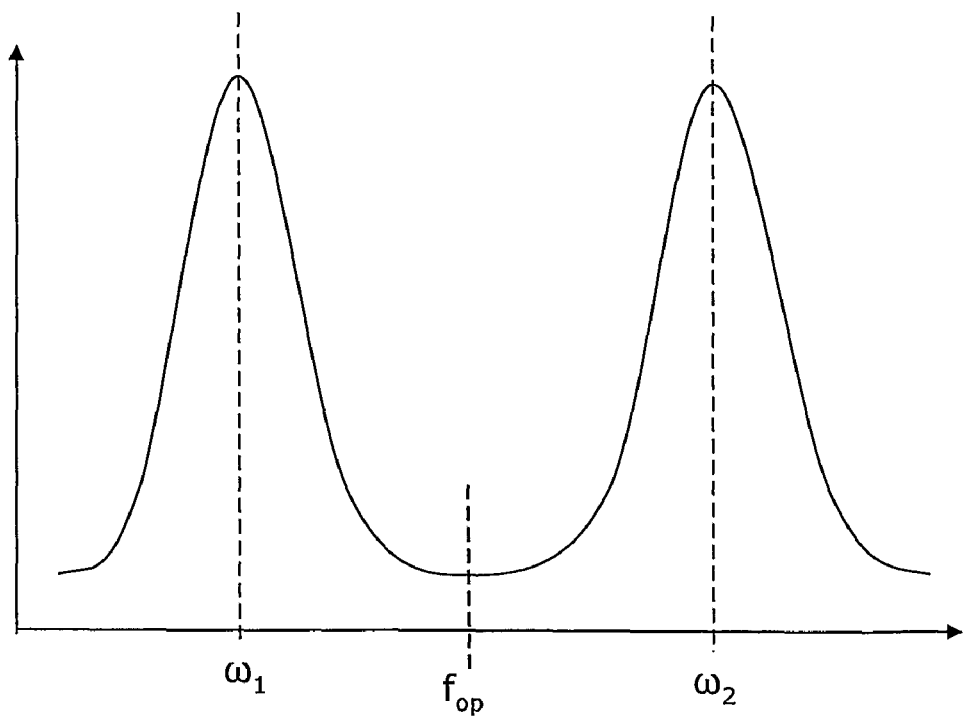
FIG. 4 illustrates torsional resonance frequencies in a drive chain of a wind turbine according to the invention including a detuner.

The above elements of the drive chain define at least one torsional resonance frequency. The present inventor has found that, if torsional resonance frequency is excited by forces occurring during operation in the drive chain, then undesired loads and tonality occur. This will be appreciated from the diagram in FIG. 3, in which the amplitude of torsional vibrations is depicted as a function of the frequency of the vibrations. In FIG. 3, $\omega$ indicates the resonance torsional frequency of the drive chain. It will be understood that torsional resonance is excited in the drive chain, if torsional forces are imparted to the drive chain at a frequency coinciding with the resonance frequency, $\omega$. It has been found by the present inventor that such excitement of torsional resonance is often the cause of tonality, and that it may also reduce lifetime of mechanical parts, such as gears.

In order to ensure that the torsional resonance frequency of the drive chain, $\omega$, does not coincide with the frequency, at which forces are imparted to the drive chain, the wind turbines of FIGS. 1 and 2 include a detuner 118 comprising a mass element 120 and an elastic element 122. In the embodiment of FIG. 1, the detuner 118 is mounted to the coupling element 112 as illustrated by brackets 124, and in the embodiment of FIG. 2, the detuner 118 is mounted to the brake 118 as illustrated by brackets 126. Thanks to the provision of the detuner 118, it may be achieved that the torsional resonance frequency depends from the mass inertia of the mass element and the elastic properties of the elastic element. Hence, the resonance frequency may be controlled, so that it does not coincide with frequencies occurring in the drive chain during operation of the wind turbine. For example, as shown in FIG. 3, the detuner may result in that the drive chain defines two resonance torsional frequencies $\omega_1$ and $\omega_2$, each of which are remote from the frequency of imparted forces, $f_{op}$. The effect of such control of the torsional resonance frequency is that undesired loads do not occur to the same extent in the drive chain as would be the case without the detuner 118, and that tonality is reduced.

Figure 5:
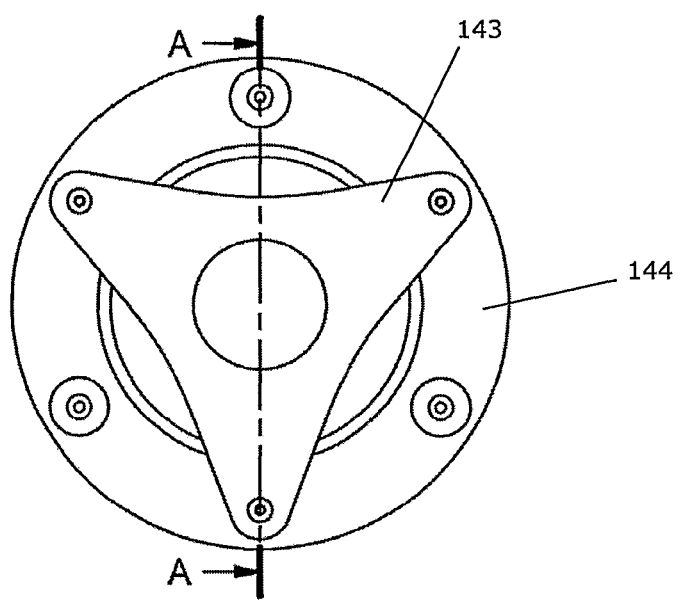
FIGS. 5 and 6 illustrate an embodiment of a detuner.
Figure 6:
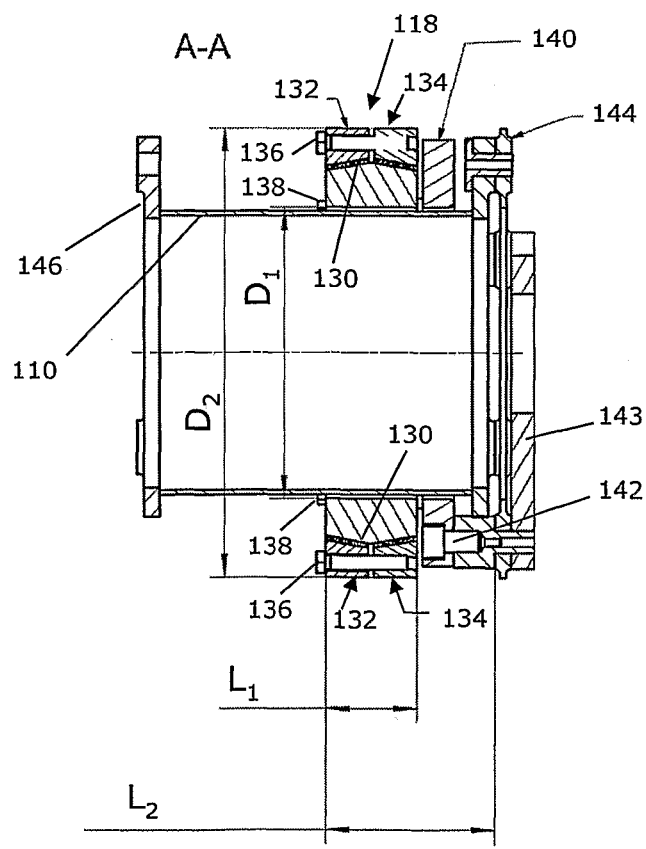

FIGS. 5 and 6 illustrate a possible embodiment of a detuner 118. In FIG. 5, the detuner is seen in an end view, whereas FIG. 6 is a cross-sectional view along line A-A in FIG. 5. The detuner includes an annular elastic element 130, which is mounted circumferentially around a hollow driving shaft, e.g. the downstream shaft 110 (cf. FIGS. 1 and 2). A gap is provided between an inner circumferential surface of the elastic element 130 and an outer surface of the shaft 110. An outer surface portion of the elastic element 130 is v-shaped when seen in cross section. Two annular mass elements 132 and 134 are provided, with their inner circumference fitting the outer v-shaped circumference of the elastic element 130. The mass elements 132 and 134 also serve as support elements for the elastic element 130. First bolts 136 are provided for holding the mass elements 132 and 134 in fixed mutual position and for maintaining a distortion of the elastic element 130. The distortion of the elastic element 130 influences the elastic properties of the elastic element 130 and thereby the torsional resonance frequency of the detuner, $\omega$, which can be approximated as $\sqrt{k/j}$, where k denotes a torsional spring constant of the elastic element 130, the torsional spring constant being dependent from the elastic properties of the element 130, and where j denotes the mass inertia of the mass elements 132 and 134, also referred to as the "active mass inertia" of the detuner. In most embodiments of the invention, the torsional resonance frequency of the detuner will be essentially equal to the torsional resonance frequency defined by the components of the drive chain.

Second bolts 138 are provided for securing the elastic element 130 and the mass elements 132, 134 to a flange 140, which, via third bolts 142, is connected to a coupling disc 144 via a triangular connecting element 143. It will be appreciated that the coupling disc 144 constitutes a fixed support for the detuner 118, and that the detuner with its mass elements 132 and 134 as well as elastic element 130 rotates with the shaft 110 during operation of the wind turbine. At its left end in FIG. 6, the shaft 110 is terminated by a further disc 146 for connecting the shaft to a further driving element or to the brake 108 (cf. FIGS. 1 and 2).

The interconnection between the detuner 118 and the coupling disc 144 defines a first torsional spring constant, $k_1$, defined by the properties of the third bolts 142 and their distortion, as well as by the mass of the flange 140. The elastic element 130 defines a second torsional spring constant, $k_2$, which preferably is at least two orders of magnitude smaller than the first torsional spring constant $k_1$. Hence, as the total torsional spring constant, $k_t$ of the detuner 118 is approximated as $(k_1 * k_2)/(k_1 + k_2)$, the contribution of $k_1$ is essentially neglectable. For most applications, the second torsional spring constant $k_2$ is between $10^5$ and $10^7$ Nm/radian, such as, e.g. approximately $2*10^6$ Nm/radian.

In one embodiment, the length $L_1$ indicated in FIG. 6 is approximately 100 mm, and the length $L_2$ is approximately 190 mm. The inner diameter of the detuner, $D_1$, is approximately 325 mm, and the outer diameter $D_2$ is approximately 500 mm. The vibrating inertia of the detuner is approximately 2.2 kgm$^2$, and the total weight of the mass elements 132, 134 is approximately 25 kg. The flange 140 has a mass of approximately 25 kg, and the total mass of the detuner is approximately 105 kg. The torsional spring constant of the elastic element 130 is approximately $1.9*10^6$ Nm/radian. It should, however, be understood that many other dimensions, mass inertia, masses, and designs are feasible, depending on e.g. conditions of operation, such as order of magnitude of frequencies to be detuned and diameter of the driving shafts of the drive chain.

Also, the location of the detuner influences the properties of the detuner. For example, if the detuner would be arranged upstream of the gear 104 (cf. FIGS. 1 and 2), larger masses would be required.

The invention claimed is:
1. A wind turbine, comprising:
a wind-driven rotor for converting wind energy to a mechanical driving force;
a power converter for converting the driving force to exploitable power;
a drive chain for rotatably transmitting the driving force to the power converter, the drive chain comprising at least one rotatable driving element, wherein at least the rotor and the at least one rotatable driving element of the drive chain define at least one torsional resonance frequency; and a detuner comprising:
    at least one mass element having a given mass inertia; and
    at least one elastic element having elastic properties,
wherein the mass element and the elastic element are arranged to rotate during operation of the wind turbine, such that the torsional resonance frequency is influenced by the mass inertia and the elastic properties, and
wherein the at least one mass element is coupled to the at least one rotatable driving element only through the elastic element.

2. The wind turbine of claim 1, wherein the drive chain further comprises a gear arranged between the wind-driven rotor and the power converter, wherein an output shaft of the gear rotates at a higher speed than an input shaft thereof, and wherein the detuner is arranged between the gear and the power converter.

3. The wind turbine of claim 1, wherein the drive chain further comprises a fixed support for the detuner.

4. The wind turbine of claim 3, wherein an interconnection between the detuner and the fixed support is less elastic than the elastic element.

5. The wind turbine of claim 3, wherein an angular resonance velocity of the detuner, $\omega$, is approximately equal to $\sqrt{k/j}$, where k denotes a detuner torsional spring constant, and j denotes an effective mass inertia of the detuner.

6. The wind turbine of claim 3, wherein the interconnection between the detuner and the fixed support defines a first torsional spring constant, $k_1$, and wherein the elastic element defines a second torsional spring constant, $k_2$.

7. The wind turbine of claim 6, wherein the first torsional spring constant $k_1$ is at least two orders of magnitude greater than the second torsional spring constant $k_2$.

8. The wind turbine of claim 3, wherein the drive chain further comprises a brake, which serves as the fixed support for the detuner.

9. The wind turbine of claim 3, wherein the drive chain further comprises a coupling mechanism, which serves as the fixed support for the detuner.

10. The wind turbine of claim 1, wherein the detuner is mounted radially around a drive shaft of the drive chain.

11. The wind turbine of claim 10, wherein the elastic element includes a substantially annular elastomeric element, which is supported by a supporting structure engaging an outer circumference of the elastic element.

12. The wind turbine of claim 11, wherein the outer circumference of the elastic element is essentially v-shaped when seen in longitudinal cross section, and wherein the supporting structure comprises two opposing support elements for engaging the respective conical portions of the elastic element, the support elements being essentially annular with their inner circumferences defining inverted cones.

13. The wind turbine of claim 12, wherein the support elements are held together by a releasable fastener, so as to allow the distortion of the elastic element to be varied.

14. The wind turbine of claim 11, wherein the at least one mass element is comprised in the supporting structure.

15. The wind turbine of claim 1, wherein the detuner is integrated in another component of the drive chain.

16. An apparatus for controlling a torsional resonance frequency in a drive chain of a wind turbine, the wind turbine comprising a wind-driven rotor for converting wind energy to a mechanical driving force, a power converter for converting the driving force to exploitable power, and the drive chain being arranged to rotatably transmit the driving force to the power converter and comprising at least one rotatable driving element, wherein the rotor, power converter and the at least one rotatable driving element of the drive chain define the torsional resonance frequency, wherein the drive chain further comprises a detuner having at least one mass element having a given mass inertia, and at least one elastic element having elastic properties, the mass element and the elastic element being arranged to rotate during operation of the wind turbine, wherein the torsional resonance frequency is influenced by the mass inertia and the elastic properties, and wherein the at least one mass element is coupled to the at least one rotatable driving element only through the elastic element.

17. The wind turbine of claim 1, wherein the at least one elastic element completely radially surrounds the at least one rotatable driving element.

18. The wind turbine of claim 17, wherein the at least one elastic element includes a single annular elastic element.

* * * * *